A. L. ALTENBRAND.
BROILER.
APPLICATION FILED MAY 1, 1911.

1,101,774.

Patented June 30, 1914.

Witnesses:
S. C. Yeaton
M. J. Daley

Albert L. Altenbrand, Inventor
By his Attorney
William C. Messimer

UNITED STATES PATENT OFFICE.

ALBERT L. ALTENBRAND, OF NEW YORK N. Y.

BROILER.

1,101,774.  Specification of Letters Patent.  Patented June 30, 1914.

Application filed May 1, 1911. Serial No. 624,299.

*To all whom it may concern:*

Be it known that I, ALBERT L. ALTENBRAND, a citizen of the United States, and a resident of the borough of Brooklyn, county of Kings, city and State of New York, have invented certain new and useful Improvements in Broilers, of which the following is a full, clear, and exact specification.

My invention comprises a broiler for cooking meats, etc., wherein I devise mechanism to facilitate a relative movement of the fire part and the supporting part for the object to be broiled.

To accomplish this in the most advantageous manner, my invention further consists in devising such means that the relatively movable parts may be so placed as to assume any desired relative positions between a practically remote position and one in which the parts are adjacent each other.

A further object is to so construct the broiler that these parts may be given the desired relative movements with as little manual exertion as possible in order to encourage the required frequent changing of the distance between them necessary to obtain the best results in the broiling operation.

In my preferred type of broiler, I give positive movement to one part only, that, preferably, being the part supporting the meat or other object to be broiled. This part is constructed to be hand operated up and down to bring it to and from the heat supplying part to assume positions best suiting different periods of the broiling operation. The movable part is also provided with counterbalancing mechanism to permit its operation with as little manual exertion as possible.

Figure 2:
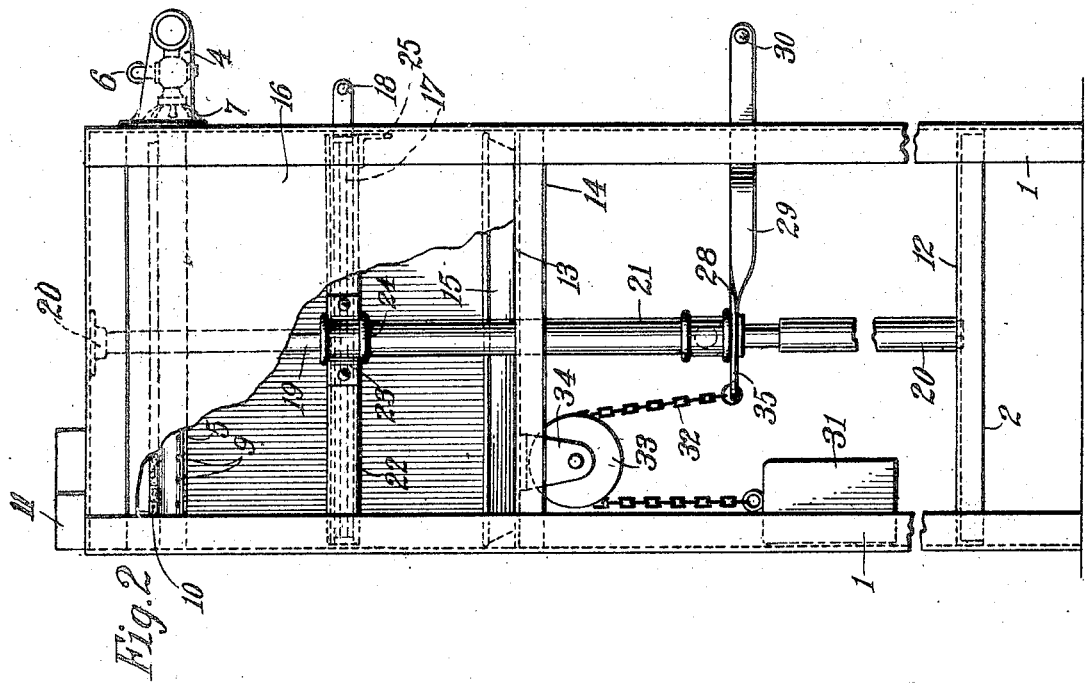
Figure 1:
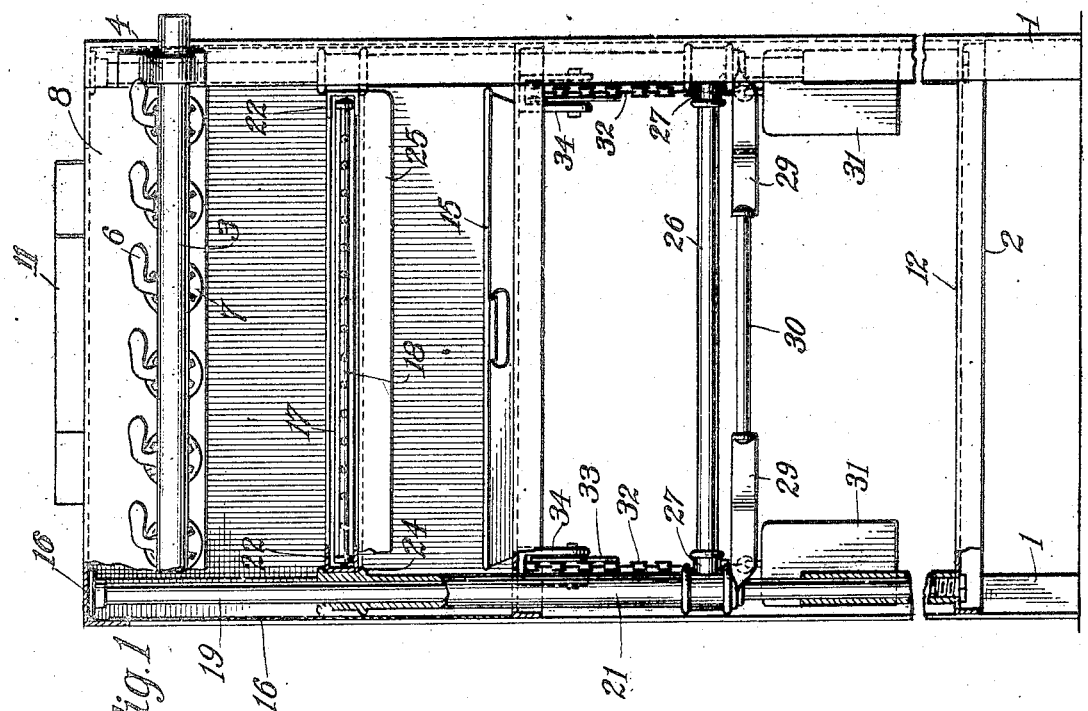

Referring to the drawings forming a part of this specification, Figure 1 is a broken front elevational view partly in section of a broiler embodying my improvements, and Fig. 2 is a broken side elevational view thereof.

My improvements may be used in any type of broilers and the desired ends may be accomplished by various kinds of mechanisms. I claim my improvements broadly however for I am not aware that prior endeavors have been made to utilize the principles involved in connection with broiling apparatus.

It is usual in broiling meats and the like in order to produce the best results, to first bring the object to be broiled in close communication with the heat to first sear or cook the outer portion. After this, it is removed farther from the source of heat and during the entire broiling operation such positions are given the object being broiled as have been found by experience to give the best results.

My invention is devised to give as little labor to the cook in properly broiling meat as is possible. It is necessary that the distance between the meat being broiled and the source of heat be frequently changed, and the object of my invention is to provide means for changing this distance wherein the minimum amount of work on the part of the cook is required.

The frame work for the broiler may be of any suitable construction and as shown, comprises four legs 1 which may be conveniently made of angle irons, and supported near their lower ends by a shelf 12 having turned-over edges 2 for securing it to the legs. The legs are supported at their upper ends by other braces, as will soon be described. At the top of the frame is secured the heat producing part which I have shown as comprising gas burners of usual construction for use in broilers. It briefly comprises a pipe 3 secured in brackets 4 for connection with the gas supply pipe (not shown), and a series of gas burners (pipes) 5 connected with pipe 3 through the cocks 6 and the air intake devices 7 secured in the supporting plate 8. The gas is preferably emitted through the holes 9 in the lower sides of the burners to produce downwardly projecting flames and deflector plates 10 of asbestos or other suitable substance are provided above the burners for deflecting the heat downwardly. The usual flue 11 is provided above the burners for the exit of the waste gases and fumes of the broiling object.

At a suitable distance below the burners is a shelf 13 having flanges 14 for stiffening it and securing it to the legs to afford further support for the frame. Upon this shelf is conveniently placed a pan 15 to catch the drippings from the meat or other object being broiled, and made portable to enable it to be emptied and easily cleaned.

The position of the shelf limits the downward movement of the gridiron soon to be described, and it should therefore preferably be placed farther down than in practice it is necessary to move the gridiron. The top of the broiler and the sides and back as far down as the shelf 13 are preferably inclosed by plates 16 to better retain the heat and intercept spatterings of grease from the object being broiled and to further afford supporting means for the frame.

The gridiron 17 represents any convenient form of open portable gridiron and has preferably a handle 18 for withdrawing it from the broiler when desired which may also be used as a handle for raising or lowering the movable framework hereinafter described to or from the burners. It is supported upon a movable framework which may be of any suitable construction to give it movement to and from the burners with the least amount of effort on the part of the cook and is so constructed that the framework with its supported gridiron and contents will remain in any desired position.

There are obviously many ways of accomplishing the above results. The construction I prefer is as follows: An upright post 19 is secured at each side of the broiler frame midway thereof by means of sockets 20 suitably secured to the framework of the broiler. Upon these posts long sleeves 21 are slidably mounted and the lower sockets may be made sufficiently high to serve as stops for the sleeves in their downward movement. A pair of runways 22 for receiving the gridiron in slidable engagement are rigidly secured to the sleeves as by means of wings 23 formed on the runways between the beads 24 formed on the sleeves. The runways are conveniently braced by one or more bracing irons 25 to rigidly secure them together. The sleeves are also braced by bracing rod 26 secured in sockets 27 to include the two sleeves in a rigid slidable frame. At a suitable position on the slidable frame may be secured a handle 28 (in this instance shown at the base of the sleeves) to best subserve the convenience of the cook, but it is obvious that the handle 28 may be omitted and the handle used to raise and lower the frame. This handle is conveniently formed of strips 29 secured to the sleeves and extending forward beyond the broiler to receive the handle proper 30 to facilitate a moving of the slidable frame with its gridiron and contents to bring them to such desired positions during the broiling operation as will produce the best results.

The compensating means may be of any suitable construction. I have shown a simple means however comprising counterweights 31 secured to one end of chains 32 passed over pulleys 33 mounted in brackets 34 depending from the shelf 13. The other ends of the chains are secured to the slidable frame as from the rearwardly projecting ends 35 of the strips 29. These weights, as is obvious, provide a counterbalance for the slidable frame, gridiron and its contents so that with little effort they may be moved to any desired position. The weights may be of a size to counterbalance an average load, and the inertia and friction of the respective parts especially between the sleeves 21 and posts 19 may be relied upon to retain the movable parts in any desired position. All then that is necessary for the cook to do during the broiling operation is to periodically move the gridiron to such positions relative to the burners as from his knowledge will produce the best results. As this is accomplished by simply moving the easily movable handle 30 up or down as the case may be to the desired position, there is little danger that there will be the neglect as in the old method of broiling, but that the meat or other objects will receive the required attention to produce the best results.

Having thus described my invention I claim—

1. In a broiler, a frame, heat producing means secured to the frame, supporting means for the object to be broiled comprising gridiron supporting rods secured in vertical positions to the frame, sleeves slidably mounted on said rods, horizontal run ways secured to the upper ends of said sleeves, a gridiron slidably engaged in said run ways, a handle, bars connecting the handle to the lower ends of the sleeves, pulleys secured to the frame, chains passed over the pulleys and secured on one side of the pulleys to the bars, and counterweights secured to the chains on the other side of said pulleys.

2. A broiler comprising a frame, a broiling chamber opened at the front and having a flue at the top, a series of gas burners at the top part of said chamber, a portable drip pan supported on the bottom of said chamber, vertical supports secured to the frame, sleeves slidably mounted on the said supports and extending within and without said broiling chamber, runways carried by said sleeves, a horizontal frame secured to said sleeves within said chamber, a gridiron slidably mounted in said run ways, a handle positioned in front of said broiler, bars connecting the handle to said sleeves, pulleys secured to the frame, chains passed over the pulleys and secured on one side of the pulleys to the bars, and counterweights secured to the chains on the other side of said pulleys.

ALBERT L. ALTENBRAND.

Witnesses:
S. C. YEATON,
EDW. B. BROOKS.